(12) United States Patent
Roy

(10) Patent No.: US 7,814,096 B1
(45) Date of Patent: Oct. 12, 2010

(54) QUERY BASED SEARCH ENGINE

(75) Inventor: H. Scott Roy, Palo Alto, CA (US)

(73) Assignee: Yahoo! Inc., Sunnyvale, CA (US)

(*) Notice: Subject to any disclaimer, the term of this patent is extended or adjusted under 35 U.S.C. 154(b) by 537 days.

(21) Appl. No.: 10/864,074

(22) Filed: Jun. 8, 2004

(51) Int. Cl.
*G06F 7/00* (2006.01)
*G06F 17/30* (2006.01)

(52) U.S. Cl. ........................... 707/721; 707/768

(58) Field of Classification Search ............ 707/721, 707/768
See application file for complete search history.

(56) References Cited

U.S. PATENT DOCUMENTS

| 5,768,578 | A | * | 6/1998 | Kirk et al. ............... 707/100 |
| 5,857,180 | A | * | 1/1999 | Hallmark et al. ............ 707/2 |
| 5,893,087 | A | * | 4/1999 | Wlaschin et al. ............ 707/3 |
| 5,987,450 | A | * | 11/1999 | Levy ........................ 707/3 |
| 7,082,428 | B1 | * | 7/2006 | Denny et al. ............... 707/5 |

* cited by examiner

*Primary Examiner*—Luke S. Wassum
*Assistant Examiner*—Nirav K Khakhar
(74) *Attorney, Agent, or Firm*—Seth H. Ostrow, Esq.; Ostrow Kaufman & Frankl LLP

(57) ABSTRACT

Providing a search result in some embodiments comprises receiving a user query, determining whether an equivalent query of the user query is included in a pre-existing query set wherein the pre-existing query set is associated with an answer, and providing the answer. Providing a search result in some embodiments comprises receiving a user query, determining that an equivalent query of the user query is not included in any of a plurality of existing query sets, and adding the user query to one of the plurality of pre-existing query sets.

20 Claims, 8 Drawing Sheets

QUERY BASED SEARCH ENGINE

FIELD OF THE INVENTION

The present invention relates generally to information retrieval. More specifically, a technique for retrieving information using a query is disclosed.

BACKGROUND OF THE INVENTION

Search engines are useful for retrieving information from sources such as the World Wide Web or document databases. Existing search engines often use a keyword search approach. Keyword search engines typically allow the user to enter one or more keywords and use an index to locate all the documents that contain the keyword entries. While the keyword based approach is useful, several problems remain. Since keyword searches often require an exact syntax match, if a user enters a keyword that is not an exact match or forms a query using language that is different from the language in the documents, the search engine may fail to find the most appropriate result. For example, if a user of a photo editing program enters "remove red eye", a document with the pertinent information that uses the word "eliminate" rather than "remove" is likely to be overlooked by a standard keyword search engine. Although a more advanced query such as "(remove OR eliminate) AND red eye" may improve the search, many users may find such a query cumbersome and difficult.

Keyword search is sometimes of limited utility for documents that contain the pertinent subject matter yet do not include any of the words that would normally be used to search for the subject, documents that include non-text information such as images, audio/video clips, documents written in another language, etc. Furthermore, if the source includes a large number of documents that include the right keywords, the number of matches may be too large to be useful for the user. It would be desirable to have a search mechanism that could address the shortcomings of keyword searches and provide more accurate search results in a user-friendly way.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for providing search results is disclosed. In some embodiments, a user query is received then compared with queries in a pre-existing query set that is associated with an answer. During the comparison, the user query may be transformed to obtain its equivalent, which is then compared to the queries. If the user query or its equivalent is determined to match to at least one of the queries in the pre-existing query set, then the query is said to map to the pre-existing query set, and the answer is then provided. The answer may include a file, a universal resource identifier (URI), a database query, or any other appropriate information. The association between the answer and the pre-existing query set is arbitrary and may be defined in any appropriate way that would help a user to locate pertinent information.

Figure 1:
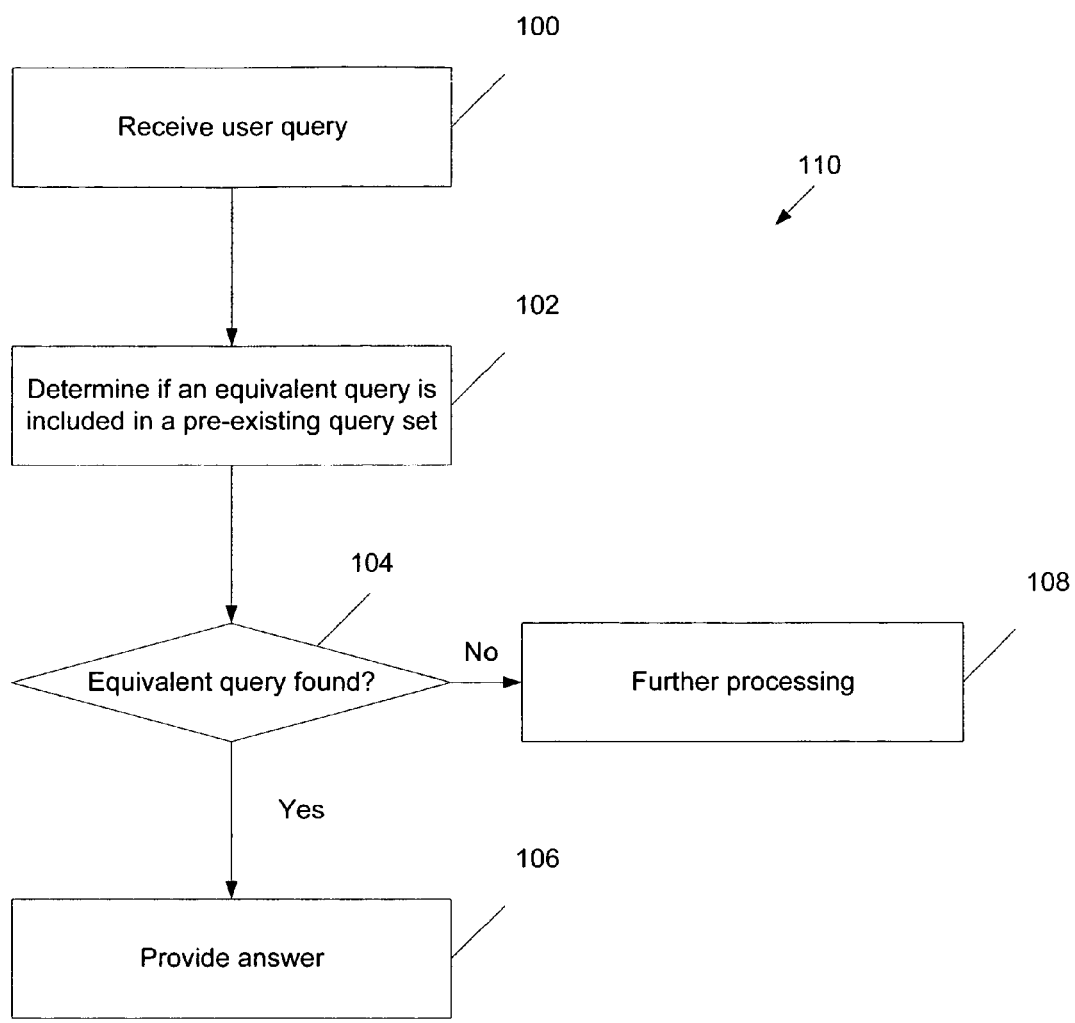
FIG. 1 is a flowchart illustrating a process of providing a search result according to some embodiments.

FIG. 1 is a flowchart illustrating a process of providing a search result according to some embodiments. In this example, process 110 begins when a user query is received (100). As used herein, a user query refers to a user input that specifies the search subject he has in mind. It may include a word, a phrase, a sentence, or any other appropriate expression. The search engine may include a plurality of pre-existing query sets each including one or more previously stored queries. Each pre-existing query set is associated with an answer that is deemed to be the most pertinent for the queries included in the set. The answer may include documents, URIs, database queries, or any other appropriate information. It is preferable to keep the number of items in the answer small by limiting the items to the most pertinent ones. In some embodiments, the answer has only one item.

It is determined whether an equivalent query of the user query is included in the pre-existing query set as entries (102). An equivalent query may be the same as the user query, or may be a query that is not identical to the user query yet conveys the same meaning. If an equivalent query of the user query is found in the pre-existing query set (104), an answer associated with the pre-existing query set is provided (106). If, however, no equivalent query is found (104), the user query is further processed (108). The processing procedure may vary depending on the implementation.

Figure 2:
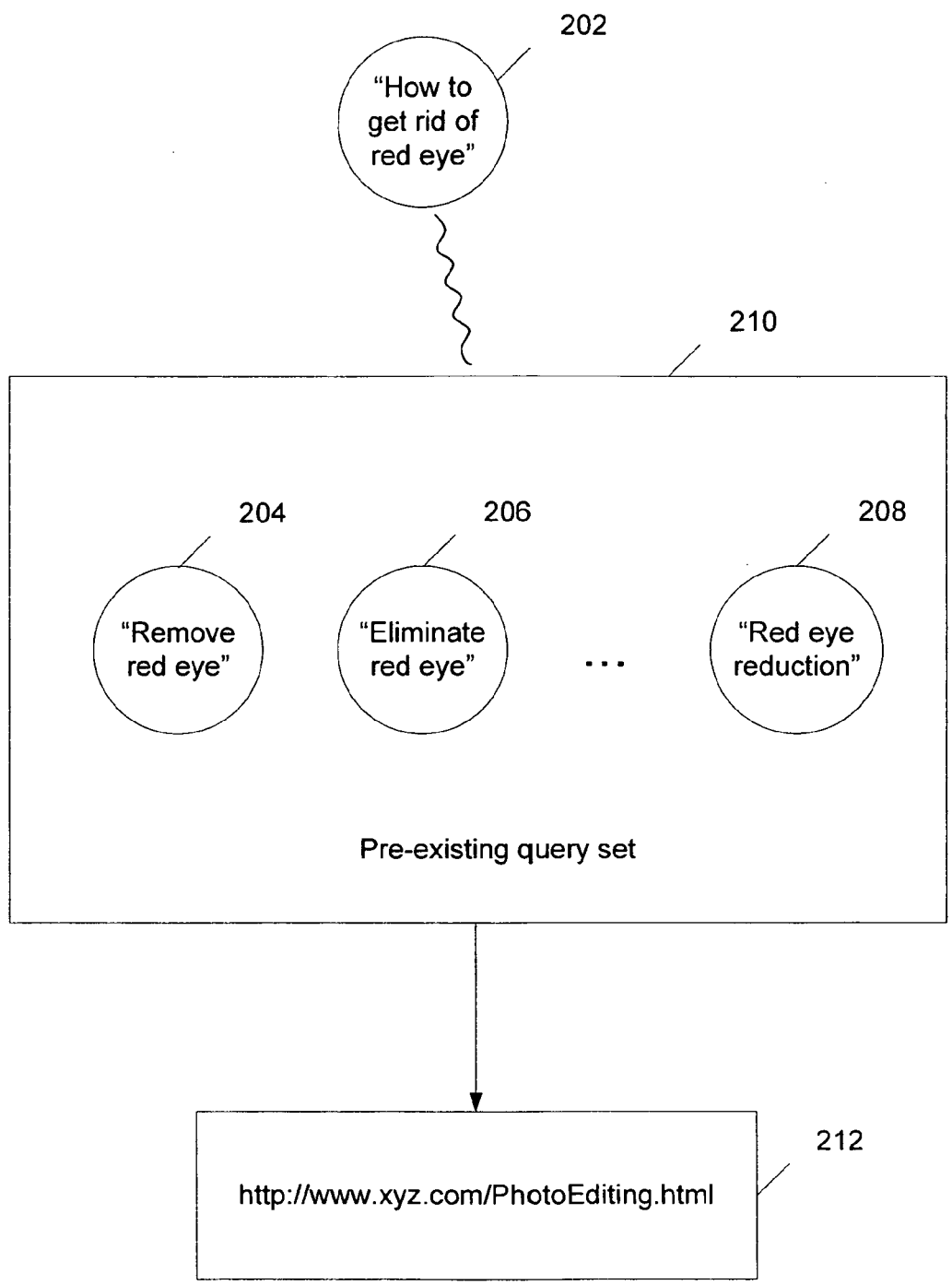
FIG. 2 is a diagram illustrating an example according to the process shown in FIG. 1.

FIG. 2 is a diagram illustrating an example according to the process shown in FIG. 1. In this example, user query 202 involves the question "How to get rid of red eye". The user query is matched against a pre-existing query set 210. In the example shown, the pre-existing query set includes several query phrases such as "Remove red eye" (204), "Eliminate red eye" (206), "Red eye reduction" (208), etc. Pre-existing query set 210 may be populated in a number of different ways depending on the implementation. For example, it may be populated from a setup file when the search engine is installed, entered manually by system administrators, power users or other users, recorded based on observation of the behaviors of various users on the system, or any other appropriate methods or combinations thereof.

The queries in the pre-existing query set are associated with answer 212. In other words, if the user enters any of the queries in the set or their equivalents, he will receive answer 212. In the example shown, the answer corresponds to a URL ("http://www.xyz.com/PhotoEditing.html"), and the corresponding document is downloaded and displayed to the user. In some embodiments, the answer may be displayed without further processing. For example, the search engine may display the URI as is without downloading the document. In some embodiments, the answer is further processed to provide the user with a search result. For example, the answer may be a search term that is applied to a database. The appropriate database entries are then presented to the user.

In some embodiments, the answer includes a file or a URI. Because the association between the answer and the queries in the pre-existing query set is arbitrary, the queries in the pre-existing query set are independent of the words in the answer file. Stated in another way, the queries in the pre-existing query set are not required to have the same words or language as the answer as long as the information included in the answer is deemed to be a suitable search result to such queries. In some embodiments, the pre-existing query set may include query terms that are not found in the answer file. For example, language such as "eliminate red eye" or "remove red eye" may not appear anywhere in the photo editing document that provides such information, but may nevertheless appear in queries in pre-existing query sets associated with the document.

In some embodiments, the answer includes an index. The index is an intermediate document that points to other documents, URIs, etc. The use of the index may allow more efficient information retrieval. In some embodiments, the answer includes operational parameters that are applicable to an appropriate operation, (for example, a database query that is applied to a database). In some embodiments, the database query is an advanced query. For example, when a user searches for "Italian flags" on an auction website, the auction website's database server may return thousands of items including flags as well as pins, stickers and charms. An input to the database that will yield a more relevant set of items may be an expert user's search query that excludes words such as charms, pins, stickers, etc. One example of an advanced query for Italian flags is the following dynamic URI: "http://search.xyzauction.com/ws/search/SaleSearch?from=R14&sosortorder=1&soincludewords=italian+flag&sosearchwordscombine=3&submit=+Search+&sapricelo=&sapricehi=&sacategory=1&soexcludewords=charm+charms+pin+sticker&socolumnlayout=&sosortproperty=1%26sosortorder%3D1&sorecordsperpage=50&solocationselector=1&saregion=0&saavailabletocountry=1&salocatedincountry=1&sacurrency=%----". Once the advanced query is identified as the answer to the user query, the advanced query may be applied to a database that returns items that are more relevant to the user's search. Although different users may see different flags listed at the auction website when they perform their search, the answer (the advanced query) remains constant.

In some embodiments, if the answer includes multiple items, the items are ranked according to their relevance. The answer may also be annotated to explain to the user why the answer is relevant to the user's search. For example, if a user is searching for "equivalent part for XYZ", an answer may be a specification for part ABC, together with an annotation explaining how ABC is compatible with XYZ.

Figure 3:
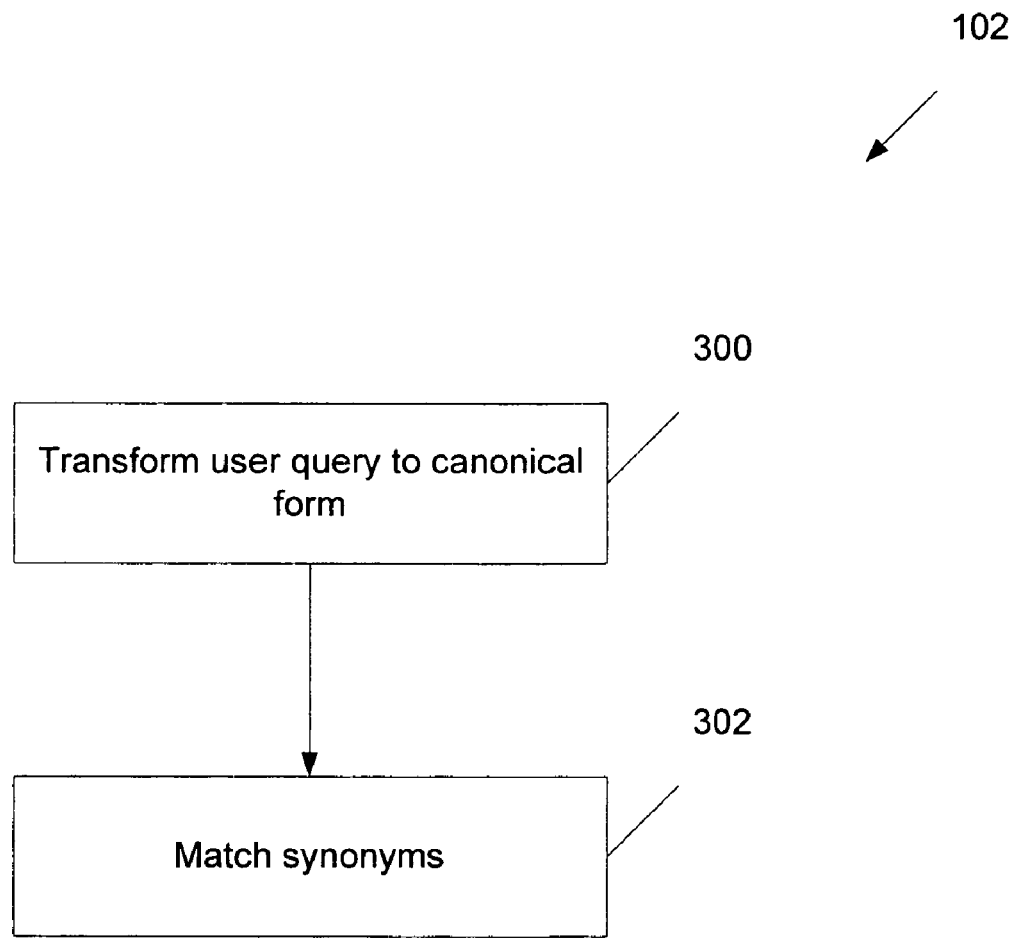
FIG. 3 is a flowchart illustrating a process of determining whether an equivalent query is included in a pre-existing query set, according to some embodiments.

There are many ways to determine whether an equivalent query is included in a pre-existing query set. Simple character by character string comparison or natural language processing are used in some embodiments. In some embodiments, as the system accumulates more and more examples of queries and answers, it automatically learns how users ask for information. FIG. 3 is a flowchart illustrating a process of determining whether an equivalent query is included in a pre-existing query set, according to some embodiments. This flowchart is a detailed example of step 102 shown in FIG. 1.

During the process shown in this example, the user query is transformed to obtain one or more equivalents, which are compared with the queries in the pre-existing query set. The user query is first transformed to its canonical form (300). As used herein, a canonical form refers to a general representation of phrases, sentences, or expressions that convey the same meaning but may have some variations such as difference in format. A canonical form may be obtained by applying a set of rules to the user query. In some embodiments, a spell checker is applied so that "get rid of redd eye" is corrected to "get rid of red eye". In some embodiments, a stemming algorithm is used to eliminate suffixes, verb tenses, and other morphological variations to simplify the query. For example, "How to get rid of red eye" is transformed to "get rid of red eye".

After the user query has been transformed into its canonical form, the synonymous forms of the user query are compared with the queries in the set (302). For example, "get rid of" is synonymous to "remove" and "eliminate". Therefore, "how to get rid of red eye" is found to match "remove red eye" as well as "eliminate red eye". The canonical transformation and the synonymous transformation may take place independent of each other. In some embodiments, only one of the transformations is employed. Other transformation techniques may be used as well.

The pre-existing query sets in the system may be updated during the course of operation to improve accuracy. In some embodiments, the system tracks a list of queries that it cannot answer, and a system administrator or expert user reviews the list and answers the queries. In some embodiments, the system observes the behaviors and interactions of its users, and then updates the pre-existing query sets accordingly.

Figure 4:
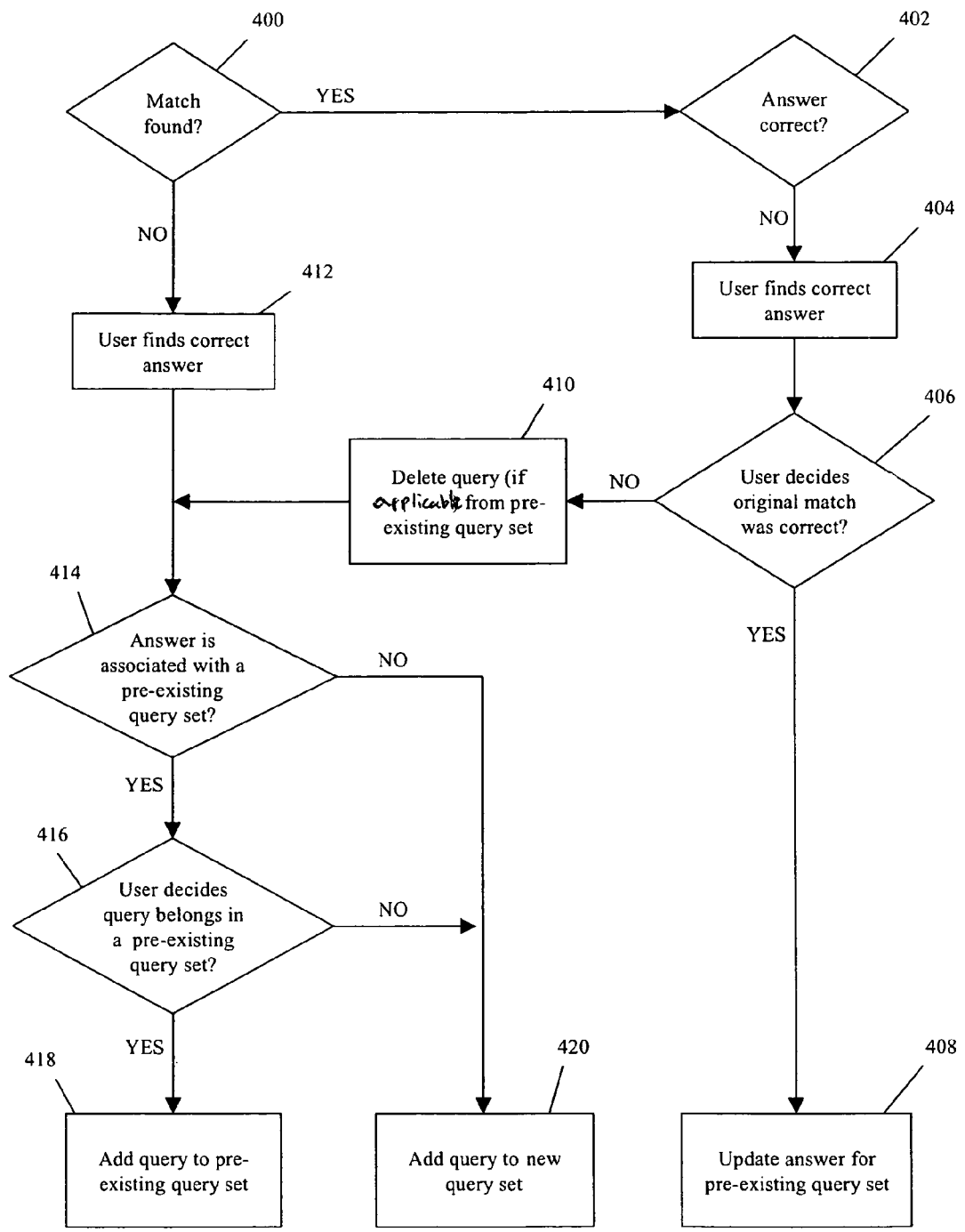
FIG. 4 illustrates one way to update pre-existing query sets by interacting with users, according to some embodiments.

FIG. 4 illustrates one way to update pre-existing query sets by interacting with users, according to some embodiments. In this example, at the beginning of the process, it is determined whether a user's query maps to any of the pre-existing query sets (400). If the user query maps to a pre-existing query set, the answer associated with that query set is displayed to the user. It is then determined whether the answer it has shown the user is correct (402). In some embodiments, the user actively indicates whether he believes the answer is correct by clicking a button or checking a check box. In some embodiments, the user does not make an active indication, and the system infers that an answer is correct or incorrect by observing the user's actions. For example, if the user selects a URI link presented in the answer, the system takes his action as evidence that the answer may be correct. If the user does not click on any URI link in the answer, the system takes his action as evidence that the answer may be incorrect. A machine learning algorithm can use repeated evidence of this sort to automatically decide whether an answer is a correct one.

If an answer is incorrect, and the user subsequently finds a correct answer and tells the system what it should be (404), the system updates itself to account for the correct information. First, it is determined why the original answer was incorrect (406). The system determines this in a similar manner as it does whether an answer is correct, by asking the user to click a button or check a check box or by watching the user's actions. In the flowchart shown, there are two possible results: either there was a mistake in the mapping process (for example "remove red eye" somehow mapped to "blue sky"), or else the answer associated with the pre-existing query set was simply wrong (for example, "remove red eye" correctly mapped to "get rid of red eye", but the answer associated with "get rid of red eye" was about painting houses rather than getting rid of red eye). If the user indicates that the mapping process was incorrect, then his query is deleted from the pre-existing query set (410) and control is transferred to 414 to determine what to do with the user's original query and the correct answer he has found. On the other hand, if the user indicates that the mapping process was correct, then the answer provided is wrong. In this case control proceeds to 408, and the system updates the answer for the pre-existing query set so that it is associated with the user's answer. In some embodiments, such as when the mapping process is simple and unlikely to be in error, the system does not query the user as indicated in 406, but instead goes directly to 408.

Returning to the beginning of the process (400), if the user's query does not map to any pre-existing query set, and the user subsequently indicates a correct answer for his query (412), then the system adds the user's query to either a new query set or an appropriate pre-existing query set. The system determines whether the answer located by the user is associated with any of the pre-existing query sets already in the system (414). If the answer is associated with a pre-existing query set, the user is given the option of deciding whether his query belongs to one of these pre-existing query sets, or whether it belongs to a new query set (416). Again, this may be accomplished by presenting options and soliciting a choice, or by watching the user's actions. If the user decides his query belongs in a pre-existing query set, then the system adds it to that pre-existing query set (418). If he decides it belongs in a new query set of its own, or if the answer he has found is not associated with any pre-existing query set, then the system creates a new query set that contains the user's query and that is associated with the user's answer (420). In some embodiments, the user's determination of whether the query should be a part of the pre-existing query set is omitted and the system automatically determines whether the query is to be added to a pre-existing query set or a newly created query set.

Figure 5:
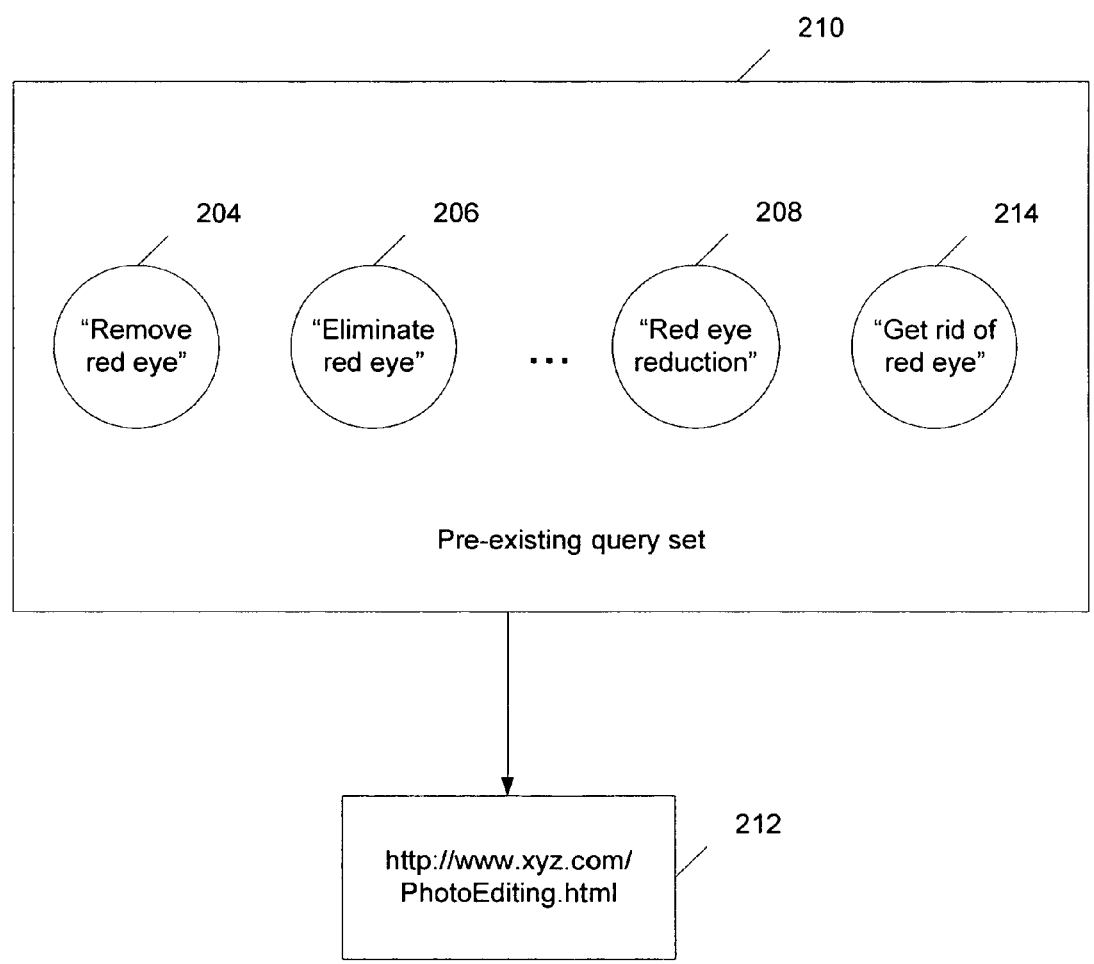
FIG. 5 is a diagram illustrating a process of handling a correct answer, according to some embodiments.

FIG. 5 is a diagram illustrating a process of handling a correct answer, according to some embodiments. In this example, one or more equivalent queries to a new user query 214 ("get rid of red eye") are found in query set 210. The answer associated with pre-existing query set 210 ("http://www.xyz.com/PhotoEditing.html") is determined to be a correct one for the user query. Optionally, user query 214 is added to pre-existing query set 210.

Figure 6:
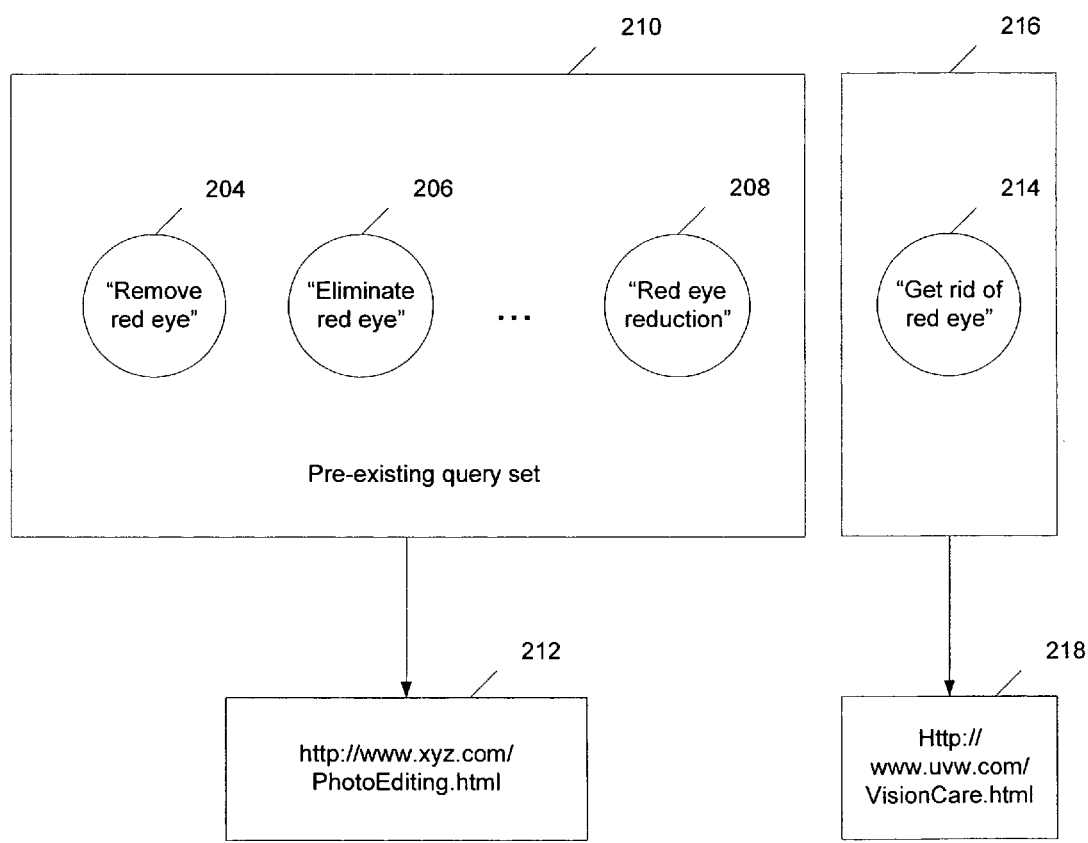
FIG. 6 is a diagram illustrating another example according to the flowchart shown in FIG. 4.

FIG. 6 is a diagram illustrating another example according to the flowchart shown in FIG. 4. In this example, although an equivalent query of user query 214 ("get rid of red eye") is found in pre-existing query set 210, answer 212 associated with the pre-existing query set ("http://www.xyz.com/PhotoEditing.html") turns out not to be the topic the user has in mind. Instead, the user finds a new answer 218 that is relevant to the topic he is interested in at http://www.uvw.com/VisionCare.html. Since the new answer is not found to be associated with any of the pre-existing query sets, a new query set 216 is created. Answer 218 and user query 214 are included in the newly defined pre-existing query set 216. In some embodiments, an ambiguous user query such as "get rid of red eye" may be added to both query sets 210 and 216. If a user enters a query that is included in multiple pre-existing query sets, all the answers may be presented as potential answers to the query and the user may choose the appropriate one.

Figure 7:
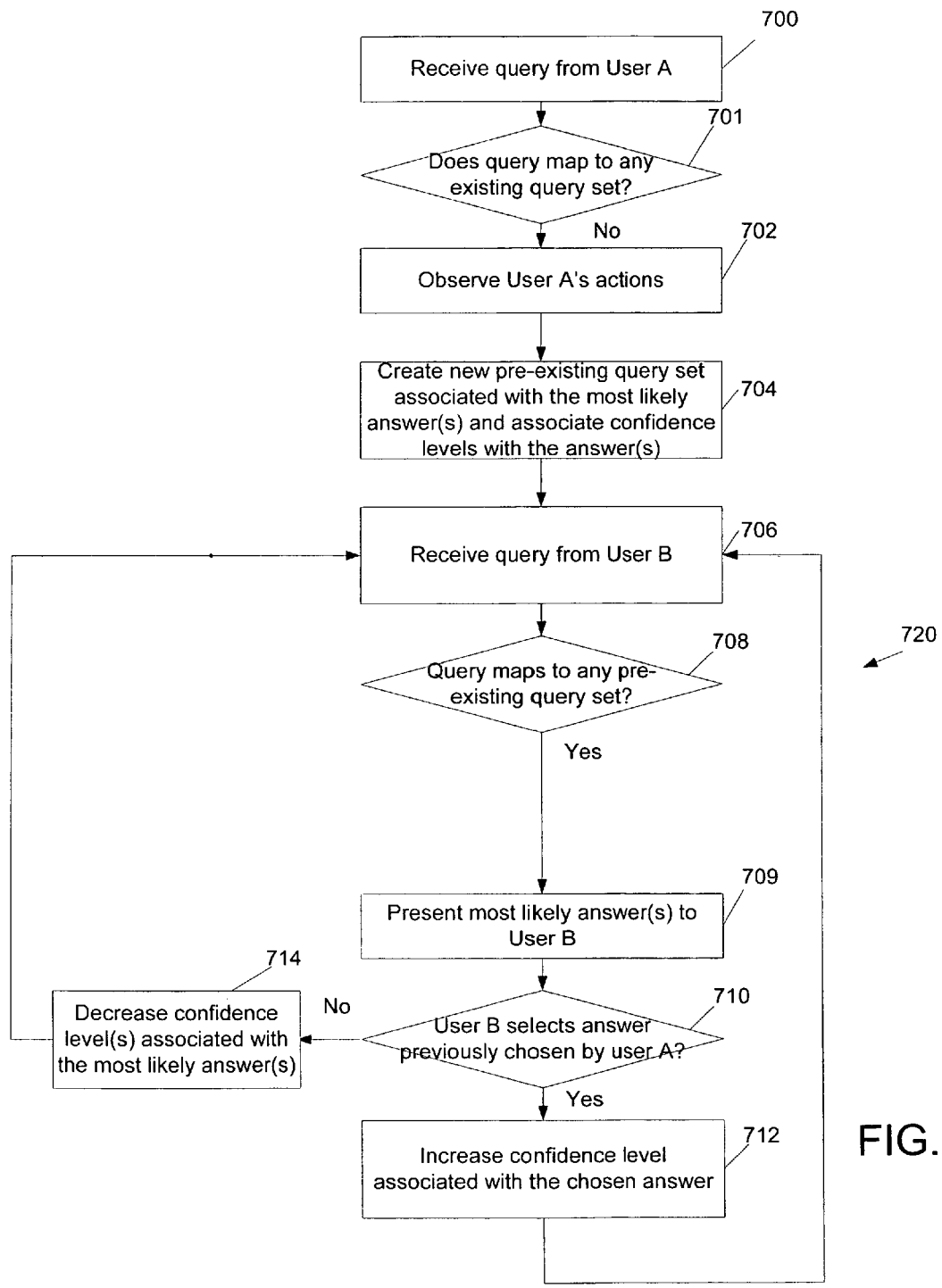
FIG. 7 is a flowchart illustrating a process for expanding a pre-existing query set according to some embodiments.

In some embodiments, multiple users in the system cooperate to improve the pre-existing query sets in the system. The knowledge gained by observing one user's actions may be used to facilitate the search process for a later user. FIG. 7 is a flowchart illustrating a process for expanding a pre-existing query set according to some embodiments. In this example, at the beginning of process 720, a query made by User A is received (700). It is determined whether the query maps to any of the existing query sets (701). If there is no successful mapping, the subsequent actions carried out by User A are observed (702). For example, User A may accept an answer provided to him or further refine his choice by searching for the appropriate item on his own. The system determines the most likely answer(s) to User A's query based on its observations, and creates a new query set that associates User A's query with the most likely answer(s). The determination of what is the most likely answer to User A's query may vary depending on the implementation. In some embodiments, the most likely answer is the last page accessed by the user. In some embodiments, the user actively indicates that a chosen page is the correct answer to the query via a user interface. In some embodiments, based on its observations of various users and their actions, the system learns and associates confidence levels with the answers that result from the users' actions. The confidence level indicates the likelihood that the answer is the correct answer for the query. As will be illustrated below, the confidence level may be re-evaluated as other users make similar queries.

The system later receives a query from User B (706) and determines whether it maps to any of the pre-existing query sets, including pre-existing query sets that are created as a result of observing User A and other users (708). If the query maps to one or more pre-existing query sets, the most likely answers to User B's query are presented (709). The most likely answer may include an answer associated with User A's query, and/or other possible answers to User B's query such as answers generated by a different search engine. It is then determined if the answer selected by User B is the answer previously chosen by User A (710). If so, the chosen answer is more likely to be correct for other users and the confidence level associated the answer is increased (712). Optionally, user B's query may be added to the pre-existing query set. If, however, the selected answer is not the answer previously chosen by User A, then the confidence level associated with the answer chosen by User A is reduced (714). In both cases, control then returns to 706 to receive queries from other users. Although a process that involves two users is described herein for the purpose of example, sometimes a user query may map to multiple answers previously chosen by several users. The confidence levels of these answers may be adjusted via a similar process as shown above.

In one example, User A may enter a search term "Italian flag" at an auction site (700). As User A refines the search and comes up with an advanced query that helps locate flags and exclude charms, pins, stickers, etc. (702), the advanced query is remembered by the system (704). Later, User B enters a search term "national flag of Italy" (706) that is similar to User A's query (708). The advanced query by User A is presented to User B as the most likely answer (708). If the advanced query is chosen by User B (710), the confidence level associated with User A's advanced query is increased (712). If, however, the advanced query by User A is rejected by User B, the associated confidence level is decreased (714).

Figure 8:
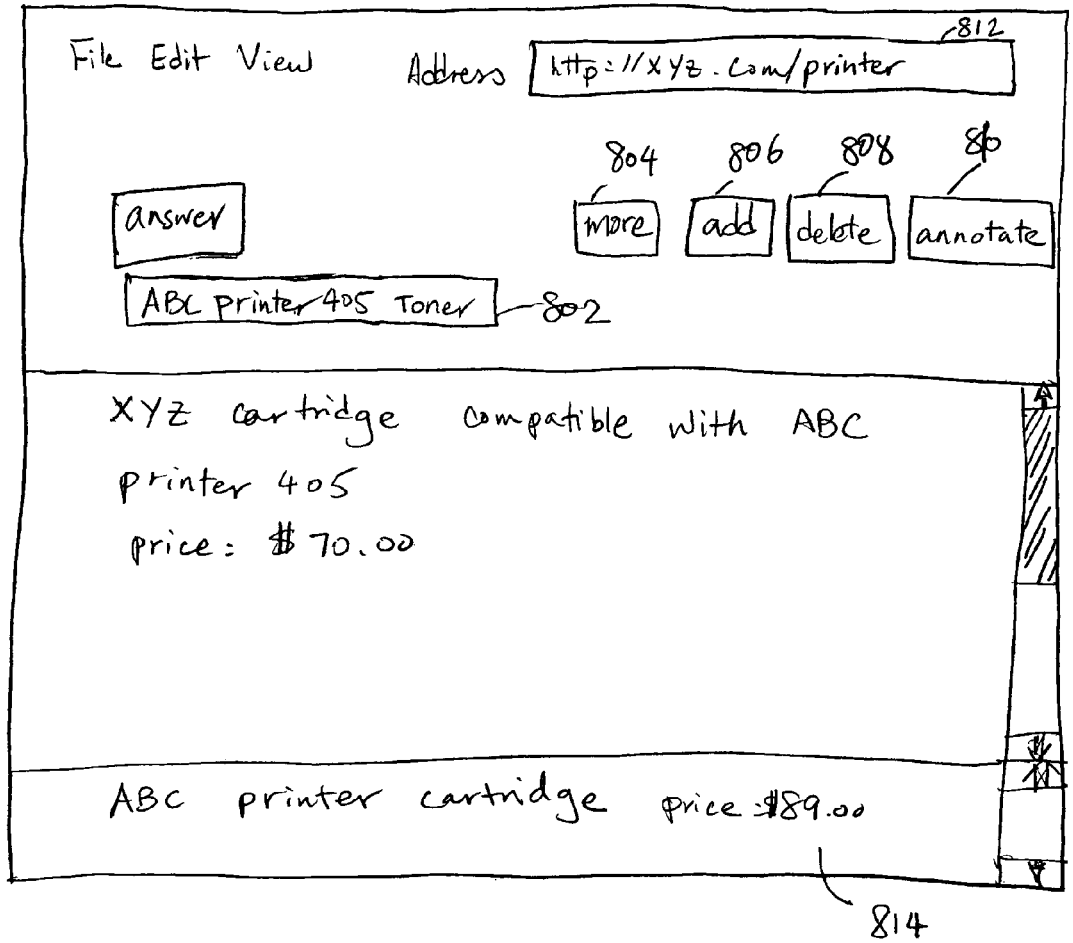
FIG. 8 is a diagram illustrating an example user interface configured to improve the pre-existing query sets of a system.

FIG. 8 is a diagram illustrating an example user interface configured to improve the pre-existing query sets of a system. Such a user interface may be used in a process for improving a pre-existing query set such as process 720. The user interface may be implemented as a tool bar, a dialog box, or other appropriate user interface component. In this example, the user interface is implemented as a plug-in for a web browser. A user query is entered in box 802. A likely answer (in this example, a web page) to the query is displayed in the browser's display window and the URI is displayed in the address box. The answer(s) may be one or more answers associated with the pre-existing query set if the user query maps to any of the pre-existing query sets, or the result from a regular search engine if the mapping is unsuccessful. The user may choose to see more potential answers by clicking the "more" button 804. The user may select one of the answers and use the "add" button 806 to add the user query to either a new query set or a pre-existing query set associated with the answer. If the answer is not included in any of the pre-existing query sets, a new pre-existing query set may be created as appropriate. If an answer appears to be irrelevant, the user may choose to remove it by clicking the "delete" button 806. The user may also choose to annotate an answer by clicking the "annotate" button 810. The annotation is shown in window 812. The user can edit this annotation and click "add" to associate it with the answer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of providing a search result, comprising:
   receiving a user query;
   transforming the user query in accordance with a first transformation to generate a canonical form of the user query;
   transforming the canonical form of the user query in accordance with a second transformation to generate one or more synonymous forms of the canonical form of the user query;
   determining whether an equivalent query of the one or more synonymous forms is included in a pre-existing query set, wherein the pre-existing query set includes one or more pre-existing queries, the pre-existing queries included in the pre-existing query set are associated with an answer designated to the pre-existing query set, the association between the pre-existing query set with the answer is independent of words present in the answer;
   providing the answer; and
   determining from actions by the user, absent any active indication, whether the provided answer is correct or incorrect,
   wherein the association between the answer and the pre-existing query set is arbitrary.

2. A method of providing a search result as recited in claim 1, wherein the answer includes a file.

3. A method of providing a search result as recited in claim 1, wherein the answer includes a file and the pre-existing query set is independent of words in the file.

4. A method of providing a search result as recited in claim 1, wherein the answer includes a file and the pre-existing query set includes a query term that is not found in the file.

5. A method of providing a search result as recited in claim 1, wherein the answer includes an advanced query.

6. A method of providing a search result as recited in claim 1, wherein the answer includes an advanced query and the method further comprises applying the advanced query to a database.

7. A method of providing a search result as recited in claim 1, wherein the answer includes a universal resource identifier (URI).

8. A method of providing a search result as recited in claim 1, wherein the answer includes an index.

9. A method of providing a search result as recited in claim 1, wherein the pre-existing query set includes a manually created query.

10. A method of providing a search result as recited in claim 1, wherein determining whether an equivalent query of the user query is included in a pre-existing query set includes comparing the user query with a pre-existing query in the pre-existing query set.

11. A computer-implemented method of providing a search result as recited in claim 1, further comprising adding the user query to the pre-existing query set.

12. A method of providing a search result as recited in claim 1, wherein the pre-existing query set is associated with a limited set of answers.

13. A method of providing a search result as recited in claim 1, wherein the answer is the only answer associated with the pre-existing query set.

14. A method of providing a search result as recited in claim 1, further comprising verifying with a user whether the answer is correct.

15. A method of providing a search result as recited in claim 1, further comprising determining whether the provided answer is correct.

16. A method of providing a search result as recited in claim 1, further comprising determining that the provided answer is incorrect, and updating the answer.

17. A method of providing a search result as recited in claim 1, further comprising determining that the provided answer is incorrect, and removing the user query from the pre-existing query set.

18. A method of providing a search result as recited in claim 1, further comprising determining that the provided answer is incorrect, and creating a new query set that includes the user query.

19. A method of providing a search result as recited in claim 1, in the event the user query does not map to any pre-existing query in any pre-existing query set, determining a correct answer for the user query, and adding the user query to a pre-existing query set associated with the correct answer.

20. A method of providing a search result as recited in claim 1, in the event the user query does not map to any pre-existing query in any pre-existing query set, determining a correct answer for the user query, and adding the user query to a new query set associated with the correct answer.

* * * * *